United States Patent
Ball et al.

(10) Patent No.: US 11,601,827 B2
(45) Date of Patent: Mar. 7, 2023

(54) RADIO GATEWAY TRANMISSION FAILURE NOTIFICATION

(71) Applicant: Cubic Corporation, San Diego, CA (US)

(72) Inventors: Karen E. Ball, Godalming (GB); Stephen J. Mansfield, Alton (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 17/114,208

(22) Filed: Dec. 7, 2020

(65) Prior Publication Data

US 2021/0176651 A1   Jun. 10, 2021

Related U.S. Application Data

(60) Provisional application No. 62/944,053, filed on Dec. 5, 2019.

(51) Int. Cl.
  *H04W 24/04*  (2009.01)
  *H04W 28/04*  (2009.01)

(52) U.S. Cl.
  CPC .......... *H04W 24/04* (2013.01); *H04W 28/04* (2013.01)

(58) Field of Classification Search
  CPC ....... H04W 4/06; H04W 80/10; H04W 28/04; H04W 76/19; H04L 65/4061; H04L 65/1023
  See application file for complete search history.

(56) References Cited

U.S. PATENT DOCUMENTS

| | | | | |
|---|---|---|---|---|
| 6,965,727 | B1* | 11/2005 | Sawabe | G11B 20/10527 386/338 |
| 7,577,455 | B2* | 8/2009 | Szymanski | H04L 65/4061 455/518 |
| 7,610,384 | B1* | 10/2009 | Schulzrinne | G06F 3/167 709/227 |
| 7,668,972 | B2* | 2/2010 | Newson | H04L 69/32 709/227 |
| 7,675,875 | B2* | 3/2010 | Lim | H04W 4/10 370/428 |
| 8,355,720 | B2* | 1/2013 | Harris | H04W 36/02 455/435.2 |
| 9,680,905 | B2* | 6/2017 | Yost | H04L 65/80 |
| 9,687,746 | B2* | 6/2017 | Sullivan | A63F 13/35 |
| 9,705,585 | B2* | 7/2017 | Sonobe | H04L 43/16 |
| 10,045,186 | B2* | 8/2018 | Albrecht | H04L 65/765 |
| 10,524,300 | B2* | 12/2019 | Ueda | G06F 3/162 |
| 10,681,506 | B1* | 6/2020 | Walker | H04L 65/1063 |
| 10,959,062 | B1* | 3/2021 | Walker | H04W 4/10 |
| 2002/0061761 | A1 | 5/2002 | Maggenti et al. | |

FOREIGN PATENT DOCUMENTS

WO   2010/070459 A1   6/2010

* cited by examiner

*Primary Examiner* — Syed Ali
(74) *Attorney, Agent, or Firm* — Mughal IP P.C.

(57) ABSTRACT

Methods and systems for indicating an audio forwarding failure at a Radio-over-Internet-Protocol (RoIP) gateway device of a RoIP system is disclosed. In one step, audio communication is detected from a radio handset communicatively coupled with the RoIP gateway device and is buffered. When an error in forwarding the audio communication to at least a portion of devices connected to the RoIP system, an audio notification indicative of the error is sent to the radio handset after determining the audio communication from the radio handset has ended.

15 Claims, 2 Drawing Sheets

RADIO GATEWAY TRANMISSION FAILURE NOTIFICATION

This application claims the benefit of and is a non-provisional of U.S. Provisional Application Ser. No. 62/944,053 filed on Dec. 5, 2019, which is hereby expressly incorporated by reference in its entirety for all purposes.

BACKGROUND

This disclosure relates in general to distributed radio systems and, but not by way of limitation, to integration of radios with phone systems amongst other things.

In Push-to-talk (PTT) systems communication is half duplex. If a user is speaking, they cannot listen to audio at the same time. Therefore if multiple users attempt to speak simultaneously they cannot hear each other. Certain systems, such as Mission Critical Push-To-Talk (MCPTT), implement floor control that only allows one user to speak at a time. Once the floor is seized by a user, audio from users without the floor is lost. In emergency situations, these losses of audio could be critical.

Half duplex radios are awkward to use in the field. Solutions such as MCPTT offers methods for implementation of floor control. Integration with modern digital communication is difficult with communication channels that are designed full duplex to allow simultaneous audio from two or more users.

SUMMARY

Embodiments of the invention(s) described herein are generally related to a system and method of providing a user of a radio gateway audio communication device with a notification when the audio forwarding fails. That said, a person of ordinary skill in the art will understand that alternative embodiments may vary from the embodiments discussed herein, and alternative applications may exist.

A Radio-over-Internet-Protocol (RoIP) gateway device enables audio communications between half-duplex endpoints (e.g., push-to-talk radios and Internet Protocol (IP) networks). In the case of push-to-talk (PTT) radios, a donor radio is attached to a Radio-over-IP (RoIP) gateway device, thus the user of a radio handset (in wireless communication with the donor radio) is often not near the RoIP gateway device and cannot see the device. This can be problematic in certain circumstances where the RoIP gateway device is unable to forward audio communication from the users radio handset (e.g., due to network problems, remote connection issues, an inability to establish a call, a failure to gain control of the floor, etc.), because the RoIP gateway device is unable to indicate this failure to the user.

This failure notification is of particular importance in MCPTT (Mission Critical Push-To-Talk). In MCPTT a user must request, and be granted, control of the floor before their audio is forwarded to other group members. The floor request from the radio gateway is only triggered once the user has started talking. Therefore, if the request is refused, the audio is dropped without user's knowledge Embodiments of the invention(s) described herein address these and other issues providing a notification to the user of a radio handset when the audio forwarding by the RoIP gateway device fails. As described in more detail below, this notification may be any of a variety of audio notifications, and (in the case of half-duplex devices) may be provided after the user has finished speaking. With this notification, the user can then retry communication or investigate the failure further.

In one embodiment, the present disclosure provides methods and systems for indicating an audio forwarding failure at a Radio-over-Internet-Protocol (RoIP) gateway device of a RoIP system is disclosed. In one step, audio communication is detected from a radio handset communicatively coupled with the RoIP gateway device and is buffered. When an error in forwarding the audio communication to at least a portion of devices connected to the RoIP system occurs, an audio notification indicative of the error is sent to the radio handset once audio communication from the radio handset has ended. The radio handset can be push-to-talk with or without trunk protocols.

In another embodiment, a RoIP system for indicating an audio forwarding failure at a Radio-over-Internet-Protocol (RoIP) gateway is disclosed. The RoIP system includes a radio handset and the RoIP gateway. The RoIP gateway detects audio communication from the radio handset communicatively coupled with the RoIP gateway device, buffers at least a portion of the audio communication upon the detection of audio communication, determines an error in forwarding the audio communication to at least a portion of devices connected to the RoIP system, and sends an audio notification indicative of the error to the radio handset after determining the audio communication from the radio handset has ended.

In yet another embodiment, a RoIP system for indicating an audio forwarding failure at a Radio-over-Internet-Protocol (RoIP) gateway is disclosed. The RoIP system comprising one or more processors and one or more memories with code for:
   detecting audio communication from a radio handset communicatively coupled with the RoIP gateway device
   responsive to the detecting, buffering at least a portion of the audio communication
   determining an error in forwarding the audio communication to at least a portion of devices connected to the RoIP system
   sending an audio notification indicative of the error to the radio handset after determining the audio communication from the radio handset has ended The radio handset comprises a half-duplex radio handset in this embodiment, but could be full-duplex in other embodiments. The audio notification could have a recorded message or audio tone. When determining the error it may include determining audio forwarding conditions are not met. When determining the error it may also include determining, after forwarding the audio, that the audio has failed to be successfully forwarded to at least one receiving device of the RoIP system. It can be determined if the audio forwarding conditions are not met prior to a threshold amount of buffering has occurred. In some embodiments, a size or time limit for the buffering is determined based on user input. The audio notification may be further indicative of an error type of the error in forwarding the audio communication.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
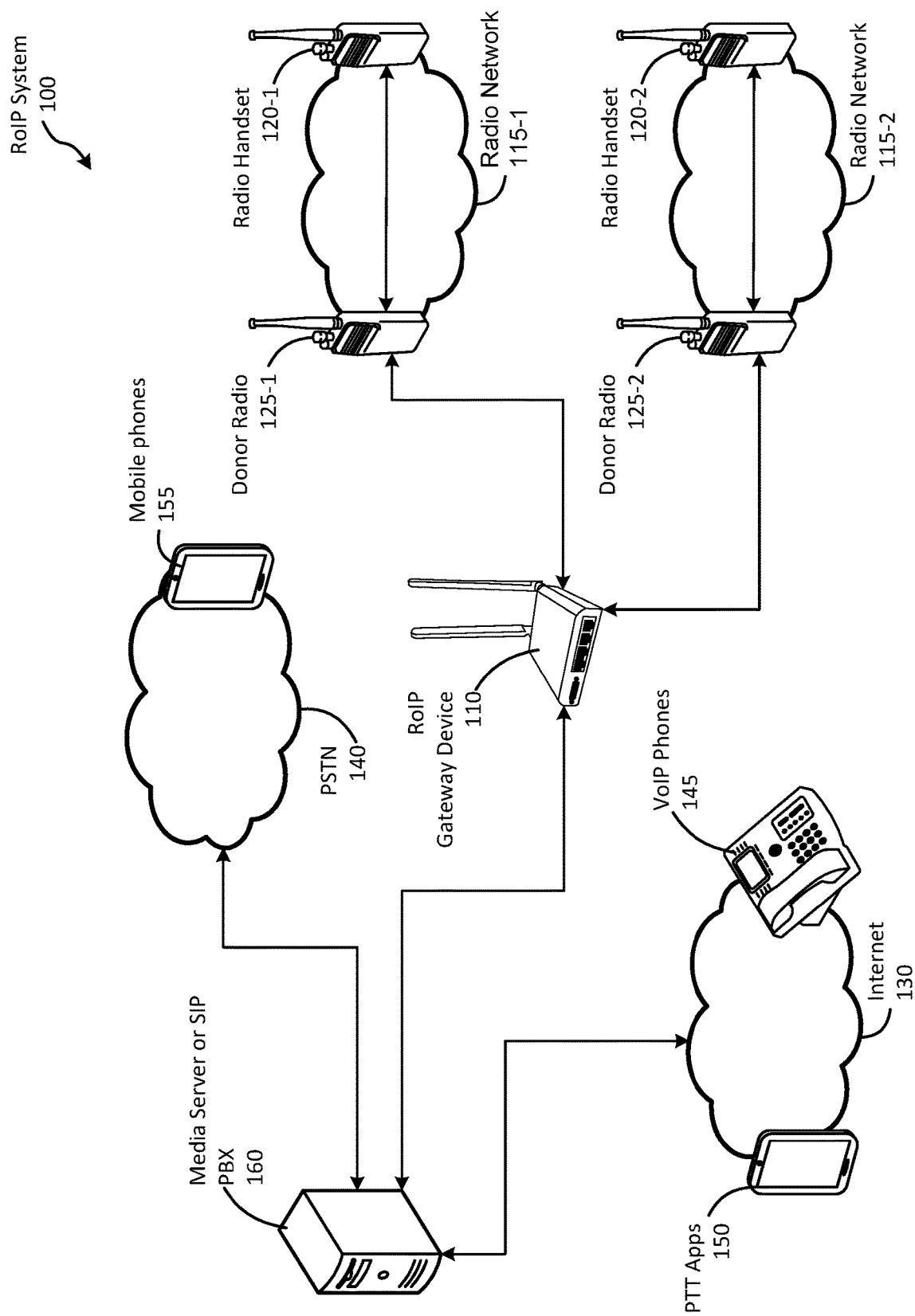
FIG. 1 depicts a block diagram of an embodiment of a Radio-over-Internet-Protocol (RoIP) system.

FIG. 1 is a simplified diagram of a Radio-over-Internet-Protocol (RoIP) system 100, according to an embodiment. As previously indicated, a RoIP gateway device 110 can operate to provide communications between various different endpoints of the RoIP system 100. Arrows connecting the various components illustrated in FIG. 1 illustrate communication links between the components, and may be implemented using any of a variety of communication technologies (e.g., wired and/or wireless communication technologies, various protocols/standards, etc.). It will be understood that the various components provided in FIG. 1 are provided as examples. A RoIP system 100 may have more or fewer components, including any number of radios (e.g., donor radios 125 and/or radio handsets 120), radio networks 115, and/or other connected devices. Radio handsets 120 may comprise Land Mobile Radio (LMR) handsets.

As used herein, the terms "audio transmission failure," "audio forwarding error," and variants thereof, are used synonymously to refer to an inability of the RoIP gateway device 110 to provide audio received from a radio handset to one or more other devices within a RoIP system.

In RoIP system 100 illustrated in FIG. 1, two different radio networks 115-1 and 115-2 (collectively and generically referred to herein as radio networks 115) are communicatively coupled with the RoIP gateway device 110. Each radio network 115 may comprise any number of radio handsets 120 (e.g., as few as two or as many as dozens, hundreds, or more), configured to communicate with each other via wireless radio frequency (RF) signals. Depending on the capacity of the RoIP gateway device 110, other radio networks (not shown) may also be communicatively coupled with the RoIP gateway device 110.

In order to communicate with each radio network 115, the RoIP gateway device 110 uses a donor radio 125 that can communicate with radio handsets 120 of the respective radio network 115 as well as with the RoIP gateway device 110. Each donor radio 125 may be communicatively coupled with the RoIP gateway device 110 via a respective one radio port of the RoIP gateway device 110.

Each of the radio networks 115 may utilize different radio platforms (different manufacturers, protocols, frequencies, etc.). And thus, radio handsets 120 from different radio networks 115 may not be able to communicate directly with each other (e.g., a first radio handset 120-1 may not be capable of communicating directly with a second radio handset 120-2). However, the RoIP gateway device 110, can relay communications between different radio networks 115. That is, the RoIP gateway device 110 can act as a bridge, communicatively connecting different radio networks 115 communicatively coupled with the RoIP gateway device 110.

Data communicated between the RoIP gateway device 110 and donor radios 125 may vary, depending on desired functionality. In addition to audio (both transmit and receive), data can also include PTT and (Carrier Operated Relay) COR signaling, which can enable the PTT functionality. The COR signal is usually derived from the squelch circuit of a receiver, signaling the presence of a radio signal at the receiver. This COR signal tells the repeater controller when a valid radio signal is present, in other words, for as long as the donor radio is receiving audio. According to some embodiments, a custom cable may be used to connect an interface of each donor radio 125 (e.g., an earpiece jack) to a radio port of the gateway device 110.

As previously noted, the RoIP gateway device 110 can further enable communication channels between radio networks 150 and an IP infrastructure, including the Internet 130 and a public switched telephone network (PSTN) 140. That is, the RoIP gateway device 110 can enable radio handsets 120 of a radio network 115 to engage in audio communications with Internet-connected devices (including, for example, VoIP phones 145, mobile and/or other connected devices executing PTT applications ("apps") 150, and the like) and/or phones (including, for example, mobile phones 155) of a PSTN 140. Additionally or alternatively, the RoIP gateway device 110 can allow radio handsets 120 to communicate with remote radio networks (not shown) coupled with remote RoIP gateway devices (not shown) communicatively coupled with the Internet 130. As such, radio handsets 120 are allowed to communicate with devices outside (and potentially remote from) their respective radio networks 115. To provide communications with IP-connected devices, the RoIP gateway device 110 can be coupled with a media server or Session Initiation Protocol (SIP) Private Branch Exchange (PBX) 160, as illustrated.

It can be noted that, in some embodiments, a RoIP system 100 may include additional networks and/or devices not shown in FIG. 1. For example, some RoIP systems may include other gateway devices remote from the RoIP gateway device 110, allowing other types of legacy networks to communicate over the RoIP system 100. In military applications, for example, other gateway devices may enable packet-based communication over a serial interface. A person of ordinary skill in the art will appreciate this and other variations to the RoIP system 100 illustrated in FIG. 1.

In many situations, the RoIP system 100 will allow audio communications by only one speaker at a time. For example, in MCPTT (currently being developed as part of the 3rd Generation Partnership Project (3GPP) standards), a radio handset 120 must request and be granted control of the floor before the RoIP gateway device 110 can forward audio received from the handset 120 via the respective donor radio 125. (The floor request can be granted based on, among other things, prioritization levels defined by MCPTT.) The RoIP system 100 may similarly manage communications in non-MCPTT applications such that audio is communicated from only one user at a time. A tone/announcement could be broadcast to the radio handsets 120 when there is a failure to gain the floor in a timely manner. Various floor control protocols could be supported in other embodiments.

The RoIP gateway device 110 may not always be able to forward audio communications received via donor radios 125 to other connected endpoints of the RoIP system 100. That is, the RoIP gateway device 110 may be unable to forward audio received from a first radio handset 120-1 via a first donor radio 125-1 to devices connected to the Internet 130, the PSTN 40, or even a second radio handset 120-2 in wireless communication with a second donor radio 125-2. Because radio handsets 120 may operate only in half-duplex mode and may have limited user interface capabilities, the RoIP gateway device 110 has no way of informing a radio handset user that the user's audio was not forwarded— particularly in cases where the radio handset 120 is half-duplex and thereby unable to receive communication while the user is speaking. This inability to inform the user that the audio has been dropped can be problematic in many situations, especially MCPTT (which is intended for use by emergency responders).

According to embodiments, the RoIP gateway device 110 can provide the user of a radio handset 120 with a notification if the RoIP gateway device is unable to forward audio received from the radio handset 120. For example, after determining it is unable to forward audio from a radio handset 120 received via a donor radio 125, the RoIP gateway device 110 may send an audio notification to the radio handset 120 once incoming audio from the radio handset 120 has stopped. The audio notification may comprise a tone, a recorded message, or the like. Different notifications may be given for different types of audio forwarding errors. Different notifications could include varying tone durations, quantity, frequency and pitch to signal different errors to the user.

It can be noted that, although embodiments provided herein describe the use of audio notifications, alternative embodiments may notify users of audio transmission errors an additional or alternative ways. For example, some radio handsets 120 may have an LED light or display, and may be capable of receiving data from the RoIP gateway device 110 indicative of the audio transmission error. The radio handset may then relay this error to the user via the LED light or display.

Figure 2:
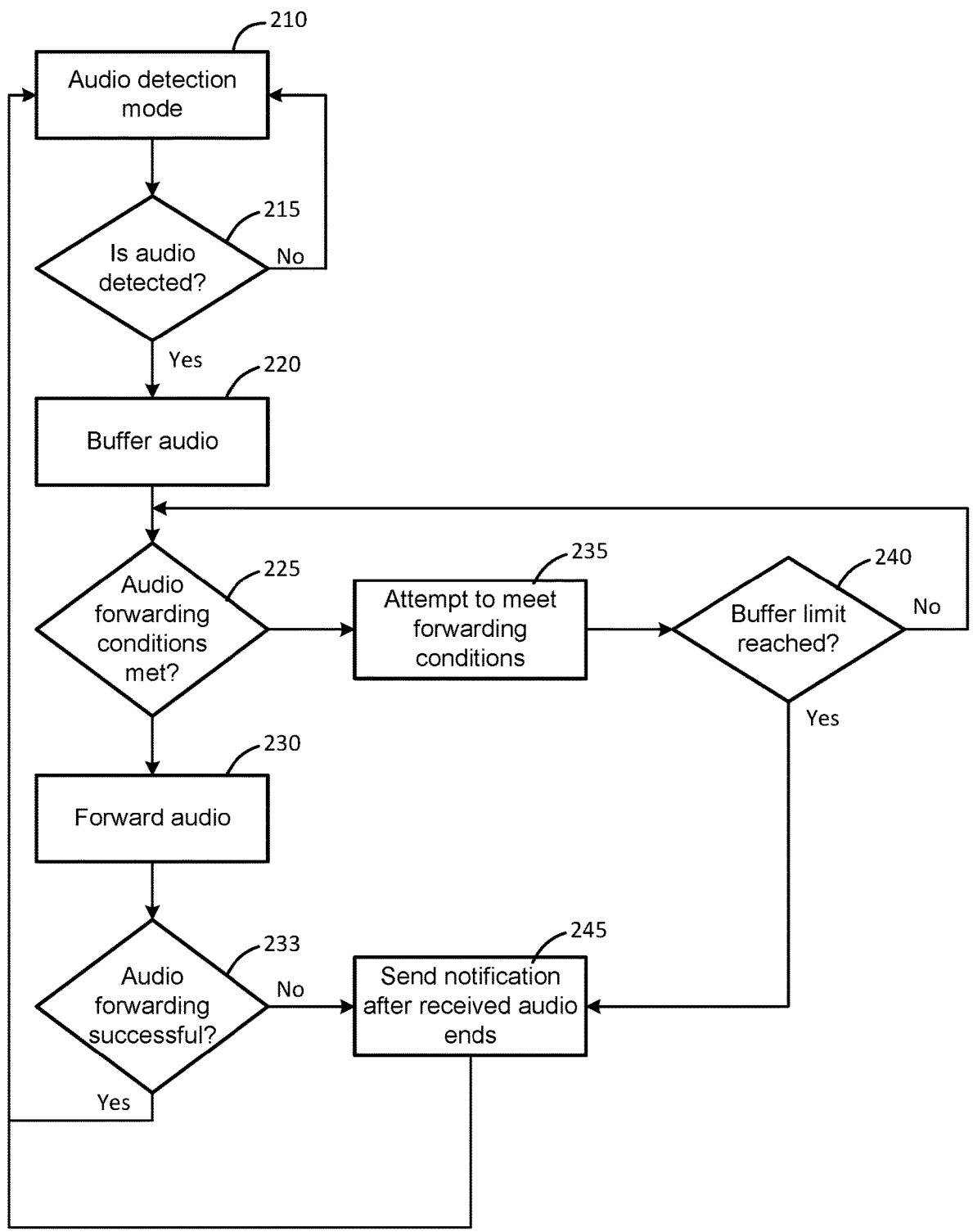
FIG. 2 illustrates a flowchart of an embodiment of a process for providing a notification to a radio handset of a transmission failure using the functions the RoIP gateway device.

FIG. 2 is a flow diagram illustrating the functions a RoIP gateway device 110 may perform for providing a notification to a radio handset 120 of a transmission failure, according to an embodiment. As with other figures herein, FIG. 2 is provided as a non-limiting example. Accordingly, alternative embodiments may execute various functions and in different order, combine and/or separate functions, etc. Means for performing the various functions illustrated in FIG. 2 may comprise hardware and/or software components of the RoIP gateway device 110. Moreover, the RoIP gateway device 110 may perform the illustrated functions for each donor radio 125 connected thereto.

The method may begin at block 210, where the RoIP gateway device 110 operates in an audio detection mode. In some embodiments, the RoIP gateway device 110 may simply monitor incoming audio from a donor radio 125 to determine if it contains audio signals above a certain threshold level. In some embodiments, a COR signal may accompany incoming audio.

As illustrated at block 215, the RoIP gateway device 110 continues to operate in the audio detection mode until audio is detected. At block 230, once audio is detected, the RoIP gateway device 110 buffers the audio. This can be done as the RoIP gateway device 110 attempts to forward the audio (as further described below).

In some embodiments, the audio buffer can be adjusted to any of a variety of sizes or lengths (time limits), according to desired functionality. Long buffer times may become an impedance to effective communication for the particular RoIP application. A delay of several seconds or more between the receipt and transmission of audio in emergency situations, for example, can make emergency response difficult. On the other hand, a short audio buffer may not be enough to establish and forward audio under certain network conditions. Thus, in some embodiments, the audio buffer may be configurable via configuration settings for the RoIP gateway device 110 (which may be accessible, for example, via a device communicatively coupled to the RoIP gateway device 110).

At block 225, the RoIP gateway device 110 then determines whether audio forwarding conditions are met. This may include determining whether a call has been made, whether (in MCPTT applications) the floor has been granted to the user from which the audio is received, or the like. If these conditions are met, the audio is forwarded (block 230).

As indicated in FIG. 2, the RoIP gateway device 110 may further determine whether audio forwarding was successful, at block 233. That is, there may be situations in which, despite audio forwarding conditions being met prior to the forwarding of audio at block 230, the audio was not successfully transmitted to all endpoints in the RoIP system 100. There may be situations, for example, in which audio was successfully forwarded to some endpoints, but not others. (The ability to determine whether audio was successfully forwarded may be dependent on underlying hardware and/or software limitations of donor radios 125, radio handsets 120, and/or other devices in the RoIP system 100.) In such instances, if the RoIP gateway device 110 is able to identify the error, the RoIP gateway device 110 may then provide an error notification (at block 245) to the audio handset from which the buffered audio originated. In some embodiments, the error notification may specifically indicate that audio was forwarded to only a portion of endpoints.

If audio conditions are not met at block 225, the RoIP gateway device 110 can then attempt to meet the forwarding conditions, at block 235 (e.g., by attempting to establish a call, requesting the floor, etc.). As shown by block 240, the RoIP gateway device 110 may continue to attempt to meet the forwarding conditions as long as the audio buffer limit (a threshold amount or limit of buffering) has not yet been reached. (In some embodiments, such as in air traffic control applications, buffered audio that is not ultimately forwarded by the RoIP gateway device 110 may still be recorded/stored.) If the buffer limit has been reached and the RoIP gateway device 110 has not been able to forward the audio, then the RoIP gateway device 110 sends a notification to the radio handset 120 from which the audio was received, at block 245. As noted by block 245, because the radio handset 120 may be a half-duplex radio handset, the RoIP gateway device 110 may wait to send the notification until after the RoIP gateway device 110 has determined the received audio from the radio handset 120 has ended, to help ensure the notification is received by the radio handset 120.

Depending on desired functionality, the type of notification sent at block 245 may vary. As noted, the notification may be provided as an audio tone or recorded message to the radio handset 120, signaling the failed attempt to forward the buffered audio. In some embodiments, different types of notifications may be provided to signal different types of errors causing the failure to forward audio. There may be a wide variety of errors that could prevent audio forwarding, so embodiments may choose to categorize these errors to indicate to the user of the handset 120 the type of error incurred. This can allow the user to determine whether simply to retry sending the audio, or to contact the operator of the RoIP gateway device 110. Far example, one type of notification may be provided to the user in situations where the RoIP system 100 is operationally in good status (e.g., in the case where the floor was not granted because someone of higher priority was speaking), whereas another type of notification may be provided to the user in situations where there are operational issues with the RoIP system 100 (e.g., in the case the RoIP gateway device 110 has lost Internet conductivity).

Along these lines, a distinction between message types could be indicating to users whether the audio forwarding error is due to a permanent fault or a temporary fault. For example, if the RoIP gateway device 110 is in a fixed location and communicates with the Internet 130 via a cellular connection (e.g., Long Term Evolution (LTE), Fifth-Generation New Radio (5G NR), etc.), a loss in Internet conductivity may be considered a permanent fault. However, in situations where the radio gateway device 110 is in a vehicle, a lack of Internet conductivity may be considered a temporary fault. The RoIP gateway device 110 may therefore be set up to distinguish between the two types of faults and provide a unique message for each type of fault. Discrete indicators such as tones or announcements for generic network problems such as: No LTE signal, IP Problems, etc. These tones could be at different frequencies, different tones of multiple frequencies, and/or modulated like Morse code. The announcements could be recorded messages to audibly identify the issue. Additionally, various MCPTT fault conditions could have other discrete indicators for conditions such as: Failed to Register, Failed to Make Call, and Failed to Gain Floor.

Ultimately, any number of message types can be provided to user, which may be provided in the form of different recorded messages, different types of tones (varying in frequency, pattern of tone pulses, etc.). That said, there could be use cases in which an operator of the RoIP gateway device may simply want to provide users with a single error message. As such, the type of messaging may be a configurable setting of the RoIP gateway device 110, allowing the operator of the RoIP gateway device 110 to decide the types of messages to provide to users.

These notifications may even be used as a provisioning aid. For example, to test the audio connection between a radio handset 120, donor radio 125, and RoIP gateway device 110, the RoIP gateway device 110 may be disconnected from the Internet. A user may then attempt to send an audio message using the radio handset 120 and, because the RoIP gateway device 110 does not have Internet conductivity, it can implement the functionality provided herein to provide an audio notification back to the radio handset 120 that audio forwarding has failed. If the notification is successfully received at the radio handset 120, the notification serves to indicate to the user of the radio handset 120 that the radio handset is successfully connected to the RoIP gateway device 110 (as is the donor radio 120).

Once the notification is sent at block 245, or the audio is determined to be successfully forwarded at block 233, the RoIP gateway device 110 can return to the audio detection mode at block 210. As previously noted, some embodiments may further involve storing the audio (either at the RoIP gateway device 110 or in a separate data storage communi- catively coupled with the RoIP gateway device 110). Additionally or alternatively, the RoIP gateway device 110 may log successful and/or unsuccessful attempts at forwarding audio.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of indicating an audio forwarding failure at a Radio-over-Internet-Protocol (RoIP) gateway device of a RoIP system, the method comprising:
    detecting audio communication from a radio handset communicatively coupled with the RoIP gateway device;
    responsive to the detecting, buffering at least a portion of the audio communication wherein the buffering has a time limit; determining an error in forwarding the audio communication to at least a portion of devices connected to the RoIP system where audio forwarding conditions are not met, wherein the error determination continues up to the time limit of the buffering; and
    sending an audio notification indicative of the error to the radio handset after determining the audio communication from the radio handset has ended, wherein:
        the audio notification corresponds to a carrier operated relay (COR) signal,
        the audio notification is transmitted when a valid audio communication is detected from the radio handset, and
        a type of the audio notification is further indicative of an error type of the error in forwarding the audio communication.

2. The method of claim 1, wherein the radio handset comprises a half-duplex radio handset.

3. The method of claim 1, wherein the audio notification comprises a recorded message or audio tone.

4. The method of claim 1, further determining the audio forwarding conditions are not met prior to a threshold amount of buffering has occurred.

5. The method of claim 1, wherein determining the error comprises determining, after forwarding the audio, that the audio has failed to be successfully forwarded to at least one receiving device of the RoIP system.

6. The method of claim 1, wherein a size or the time limit for the buffering is determined based on user input.

7. A RoIP system for indicating an audio forwarding failure at a Radio-over-Internet-Protocol (RoIP) gateway device, the RoIP system comprising:
    a radio handset;
    the RoIP gateway device, wherein the RoIP gateway device:
        detects audio communication from the radio handset communicatively coupled with the RoIP gateway device,
        buffers at least a portion of the audio communication upon the detection of audio communication, wherein the buffering has a time limit;
        determines an error in forwarding the audio communication to at least a portion of devices connected to the RoIP system where audio forwarding conditions are not met, wherein the error determination continues up to the time limit of the buffering; and
        sends an audio notification indicative of the error to the radio handset after determining the audio communication from the radio handset has ended, wherein:
            the audio notification corresponds to a carrier operated relay (COR) signal,
            the audio notification is transmitted when a valid audio communication is detected from the radio handset, and
            a type of the audio notification is further indicative of an error type of the error in forwarding the audio communication.

8. The RoIP system for indicating the audio forwarding failure at the RoIP gateway device of claim 7, wherein the radio handset comprises a half-duplex radio handset.

9. The RoIP system for indicating the audio forwarding failure at the RoIP gateway device of claim 7, wherein the audio notification comprises a recorded message, Morse code, or audio tone.

10. The RoIP system for indicating the audio forwarding failure at the RoIP gateway device of claim 7, wherein a size or the time limit for the buffering is determined based on user input.

11. A RoIP system for indicating an audio forwarding failure at a Radio-over-Internet-Protocol (RoIP) gateway device, the RoIP system comprising one or more processors and one or more memories with code for:
    detecting audio communication from a radio handset communicatively coupled with the RoIP gateway device;
    responsive to the detecting, buffering at least a portion of the audio communication wherein the buffering has a time limit;
    determining an error in forwarding the audio communication to at least a portion of devices connected to the RoIP system where audio forwarding conditions are not met, wherein the error determination continues up to the time limit of the buffering; and
    sending an audio notification indicative of the error to the radio handset after determining the audio communication from the radio handset has ended, wherein:
        the audio notification corresponds to a carrier operated relay (COR) signal,
        the audio notification is transmitted when a valid audio communication is detected from the radio handset, and
        a type of the audio notification is further indicative of an error type of the error in forwarding the audio communication.

12. The RoIP system for indicating the audio forwarding failure at the RoIP gateway device of claim 11, wherein the radio handset comprises a half-duplex radio handset.

13. The RoIP system for indicating the audio forwarding failure at the RoIP gateway device of claim 11, wherein the audio notification comprises a recorded message or audio tone.

14. The RoIP system for indicating the audio forwarding failure at the RoIP gateway device of claim 11, further determining the audio forwarding conditions are not met prior to a threshold amount of buffering has occurred.

15. The RoIP system for indicating the audio forwarding failure at the RoIP gateway device of claim 11, wherein determining the error comprises determining, after forwarding the audio communication, that the audio communication has failed to be successfully forwarded to at least one receiving device of the RoIP system.

* * * * *